READ-WRITE CIRCUIT FOR MAGNETIC RECORDING

Filed April 16, 1956 3 Sheets-Sheet 1

INVENTOR.
TUNG CHANG CHEN
BY
Ralph K. Bonell
AGENT

READ-WRITE CIRCUIT FOR MAGNETIC RECORDING

Filed April 16, 1956 3 Sheets-Sheet 2

*INVENTOR.*
TUNG CHANG CHEN
*BY*
Ralph K. Bonell
AGENT

READ-WRITE CIRCUIT FOR MAGNETIC RECORDING

Filed April 16, 1956 3 Sheets-Sheet 3

*INVENTOR.*
TUNG CHANG CHEN
*BY* Ralph K. Bonell
AGENT

United States Patent Office 2,969,528

Patented Jan. 24, 1961

2,969,528

READ-WRITE CIRCUIT FOR MAGNETIC RECORDING

Tung Chang Chen, Havertown, Pa., assignor to Burroughs Corporation, Detroit, Mich., a corporation of Michigan Filed Apr. 16, 1956, Ser. No. 578,413

4 Claims. (Cl. 340—174.1)

This invention relates to electronic digital computers. More particularly, it refers to read-write circuits as elements of such computers and to their operation in conjunction with magnetic data storage media.

In conventional arrangements for recording (writing) digital data on magnetic discs, drums, or tape, by means of electromagnetic transducers and for reading recorded data by like means, it has been necessary in order to attain suitable electrical signal levels to use individual amplifiers in the recording and reading circuits. This has been true even when the same transducer has been used both for recording and reading purposes. In contrast to such conventional arrangements the present invention provides a read-write circuit wherein one amplifier element is used in both processes, thus effecting a reduction in the space occupied and the power consumed by the apparatus associated with a given number of computer information channels. In addition, a higher output signal level is developed in the reading processes than is possible with the same number of elements in previous circuits. These and other advantages later referred to are realized, in part, by using the magnetic coupling between two windings of a single transducer or read-write head to provide the feedback in a triggered (not free-running) blocking oscillator type of circuit hereinafter described in detail.

The invention, while having general utility in its field, has particular advantages when operating with a magnetic recording medium comprising discrete magnetizable elements rather than a continuous magnetizable surface. A medium of this type is disclosed in the co-pending application of the present inventor, Serial No. 482,854, filed January 19, 1955, entitled "Discrete Element Magnetic Recording."

It is an object of the present invention to provide an improved, simplified and low cost read-write circuit for use in conjunction with digital magnetic storage devices.

Another object is to provide a circuit of the above character which has particular utility in connection with a medium for recording digital data comprising discrete magnetizable elements, each adapted to store an information bit.

Another object is to provide a circuit of the above character in which an amplifying element is used both for recording and reading purposes.

Another object is to provide a circuit of the above character comprising an electron discharge device, operating in the manner of a blocking oscillator.

A further object is to provide a circuit of the above character adapted to supply high level electrical signals in the reading process, with a minimum of apparatus.

Other objects and advantages of the invention will be apparent from consideration of the following specification and of the appended drawings in which.

Figure 1:
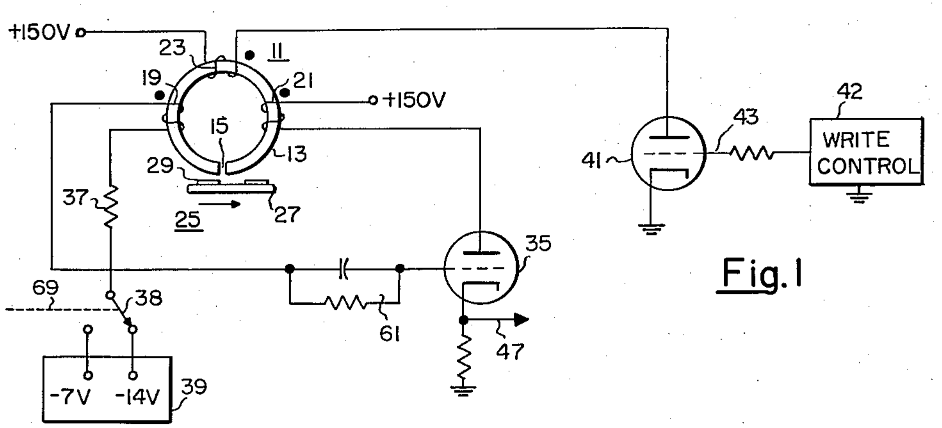
Fig. 1 is a circuit diagram of one embodiment of the invention.

Referring first to Fig. 1, there is shown a conventional transducer or read-write head 11 having a magnetic circuit comprising core 13 in which there is a narrow transverse gap 15. Three windings 19, 21 and 23 are mounted on core 13. Head 11 is adapted, when one or more of said windings is energized, to magnetize selected portions of displaceable recording medium 25, through flux fringing from gap 15, and to receive flux of varying strength from such magnetized portions, and thereby generate a voltage in said windings, as the medium is displaced past the head in reading stored information.

Figure 8:
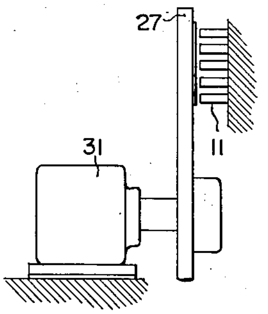
Fig. 8 shows driving arrangements for the medium of Fig. 7.
Figure 7:
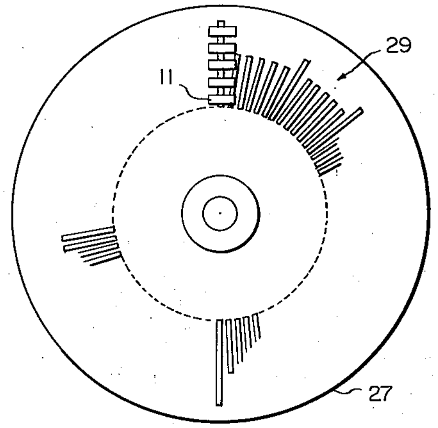
Fig. 7 shows a magnetic recording medium in the form of a rotatable disc mounting discrete recording elements.

Medium 25 may take various forms. Fig. 7 illustrates the form more fully disclosed in said application, Serial No. 482,854, wherein a rotatably mounted disc 27 of non-magnetic material bears discrete radially extending surface elements 29 of magnetizable material with which read-write heads, as head 11, co-operate along concentric circular data tracks. In recording information, elements 29 are magnetized in the direction of their displacement past the heads and in a sense which determines the value of the recorded binary digit. Fig. 1 shows a portion of disc 27 with magnetizable elements 29 mounted thereby, illustrating a single data track. Fig. 8 shows disc 27 as being mounted on the shaft of motor 31 for rotation thereby. Arrangements in which the storage disc or equivalent displaceable member has a surface layer of continuously magnetizable material and information is recorded as magnetized areas thereof, also may be employed but, in general, produce a somewhat lower output signal level in reading the stored data.

Of the three transducer windings, 19, 21 and 23, respectively, winding 19 has one end thereof connected to the grid of triode 35 and the other end connected by way of resistor 37 and switch 38 to one terminal of source 39, which supplies two values of negative grid potential to triode 35 each adapted to bias the tube beyond cut-off. Winding 21 has one end thereof connected to the plate of triode 35 and the other end connected to a source of positive potential. Winding 23 is shown as connected at one end to the plate of triode 41 and at the other end to a source of positive potential. Triode 41, active in the writing process, only, normally is negatively biased beyond cut-off, by means not shown. Pulses for recording information are applied to the grid of this tube from "write control" circuit 42 by way of input lead 43. Signals resulting from the reading of information stored on disc 27 appear on lead 47, connected to the cathode circuit of triode 35.

The directions of windings 19 and 21 are such that positive feedback occurs from the plate to the grid circuit of triode 35, tending to cause the tube to oscillate, when its grid potential permits. Because of the close magnetic coupling between these two windings, if the grid potential is momentarily raised above cut-off to initiate conduction in triode 35, this tube, with associated elements, behaves in the manner of a blocking oscillator, to generate a single short, self-terminated, non-repetitive output pulse. The present arrangement is not a free-running oscillator since the grid of triode 35 is permanently connected to a source of bias potential which cuts off conduction and prevents oscillation except for a predetermined short period following the application of a trigger impulse to the grid. The use of the read-write head as the blocking oscillator transformer, in addition to its normal functions, is to be noted as one of the advantages of and savings in apparatus effected by the invention.

Figure 2:
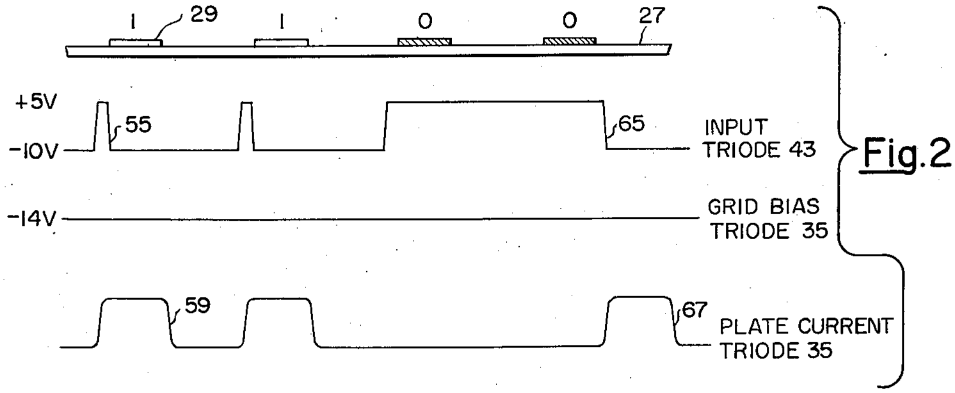
Fig. 2 shows a portion of a discrete element magnetic recording medium together with a series of related waveform diagrams, illustrating the operation of the invention in recording data.

Fig. 2 illustrates the operation of the circuit of Fig. 1 in writing data. On the top line of this figure, for reference purposes, a number of magnetizable recording elements 29 are shown, borne by disc 27, each adapted to store a single bit of information. It will be considered that the two left-hand elements are to be magnetized (in the direction of their displacement) in a sense characteristic of a binary "one" and that the two right-hand elements are to be magnetized in the opposite sense, to represent "zeros." During the writing process triode 35 is continuously biased at the more negative of the two potentials supplied by source 39, as shown on the third line of Fig. 2.

To write a "one," a positive-going voltage pulse 55, shown on the second line of Fig. 2, is applied to input lead 43, connected to the grid of triode 41, at an instant just prior to that at which one of the recording elements 29 is in writing position, relative to gap 15 in core 13. This pulse is of suitable amplitude to raise the grid potential of triode 41 above cut-off and cause current flow in the plate circuit and in winding 23. Since the selected element 29 is not yet in writing position, it is unaffected by the magnetomotive force induced in core 13 by this current. At the time of occurrence of the trailing edge of pulse 55, the leading edge of the selected element 29 is about to move into writing position and at this time the decay of current in winding 23 induces a voltage, particularly in winding 19, which is of sufficient magnitude and in the right direction to overcome the normal negative grid bias of triode 35 and start a transient oscillation. This is shortly quenched in blocking oscillator manner. The resulting pulse of plate current in triode 35 is shown on the bottom line of Fig. 2 as pulse 59. The appearance of this current pulse in winding 21 and of the corresponding pulse of magnetomotive force in core 13 coincides with or overlaps, in time, the passage of the selected magnetic element 29 though the writing position and the element is thereby magnetized in the sense chosen to represent a binary "one." The duration of current pulse 59 is controllable by selection of the time constant of RC circuit 61. Successive "ones" are written by applying individual triggering pulses to lead 43 in suitable time relationship to the arrival of successive recording elements 29 in writing position.

In writing a binary "zero," a positive-going pulse again is applied to lead 43, of suitable amplitude to cause plate conduction in triode 41 and thereby produce a current in winding 23. This action is initiated just as a recording element 29 is about to enter the writing position and continues as long as zeros are to be written, as shown by pulse 65 on the second line of Fig. 2. Due to its winding direction, the energization of winding 23 in this operation magnetizes each element 29 passing through writing position in the opposite sense to the magnetization caused by the plate current of triode 35 in winding 21 in the writing of a "one." The positive voltage pulse 65 applied to lead 43 is terminated after the last magnetic element on which a zero is to be written has passed through the writing position and before the next element appears. Thus the pulse 67 of current in the plate circuit of triode 35 due to the oscillation initiated by the trailing edge of pulse 65, is ineffective to magnetize an element 29. The use of spaced input pulses 55 and 65 implies a source of such pulses as an element of circuit 42.

Figure 3:
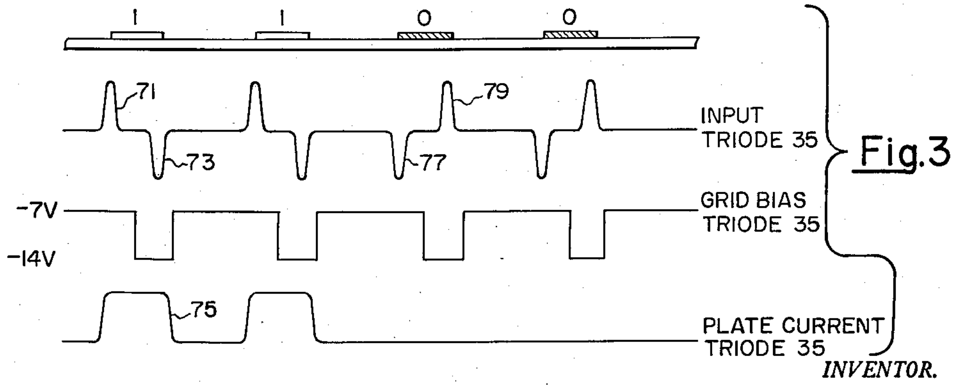
Fig. 3 is similar to Fig. 2 except that it illustrates the operation of the circuit of the invention in reading data.

Fig. 3 illustrates the operation of the circuit of Fig. 1 in reading data magnetically stored by magnetic elements 29. In this process triode 41 remains cut off and the grid bias of triode 35 instead of being held at a constant value is switched between the two values provided by source 39 synchronously with the passage of magnetic elements 29 through the reading position. Fig. 1 schematically shows a mechanically operable switch 38 with operating means 69 therefore, it being understood that this showing is for simplicity of illustration and that in practice known means adapted for high-speed operation will be employed, usually an electronic switching circuit which may be common to several data channels.

On the top line of Fig. 3, for reference purposes, a sequence of magnetic elements 29 is again shown. These are assumed to me magnetized as above described in connection with the operation of writing data. On the second line the voltage induced in winding 19 and applied to the grid of triode 35 is shown; on the third line the two-valued bias or control voltage for triode 35; and on the bottom line the plate current of this triode, which is also the current in winding 21.

Positive pulse 71, for example, illustrates the voltage induced in winding 19, when the leading edge of an element 29, magnetized in the assumed "one" direction or sense, approaches and passes gap 15 in core 13 while negative pulse 73 illustrates the effect of the passage of the trailing edge. During the period of pulse 71 the bias of triode 35 is at its higher or less negative value. Pulse 71 is of sufficient amplitude to raise the potential of the grid of this tube above cut-off, under this condition. This initiates a transient oscillation of triode 35, as in the writing process, the effect of which on the plate current of the tube is seen as pulse 75. The amplitude of pulse 75 is considerably greater than the amplitude of the reading pulse obtained from conventional circuits. Before negative pulse 73 occurs, the bias of triode 35 is switched to its more negative value which prevents the possibility of any disturbance due to this pulse starting an oscillation. The read-out is non-destructive and plate current pulse 75 causes a "one" to be written over the "one" being read, thereby regenerating the record if any deterioration has occurred.

When a magnetic element 29 magnetized to store a binary "zero" passes through the reading position the sequence of positive and negative pulses induced in winding 19 is reversed, that is, the leading edge of the element induces a negative pulse, as pulse 77 while the trailing edge induces a positive pulse, as pulse 79. The alternation of the two bias potentials applied to the grid of triode 35 continues as before. As seen in the figure this results in a relationship of bias and trigger voltages such that no oscillation can start and no voltage therefore appears on output lead 47. This is so because negative pulse 77, for example, reduces the then existing steady potential of the grid, which is the higher or less negative of the two bias potentials supplied by source 29, to a value still further below cut-off while at the time positive pulse 79 occurs the steady grid potential has been reduced to the lower or more negative of its two values and the addition of the voltage of pulse 79 thereto is insufficient to raise this potential above cut-off.

As was shown in Fig. 7, in addition to the magnetizable elements storing data binary digits or "bits," provision may be made for storing signals signifying the beginning and end of digit groups. These signals will normally be recorded and read by heads particularly assigned for this purpose, the operations of recording and reading the signals being the same as described above.

In addition to the advantage of the present circuit in providing a high level output in the reading process, the circuit overcomes a disadvantage of earlier read-write circuits in that there can be no blocking of the reading amplifier due to the writing process. Also, due to the manner in which the read signals are generated cross-talk between channels is minimized.

Figure 5:
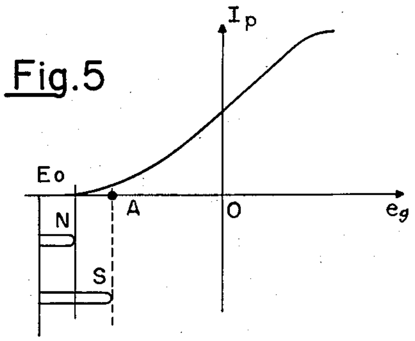
Figs. 5 and 6 are diagrams relating to the operation of the circuits of Figs. 1 and 4, respectively.
Figure 4:
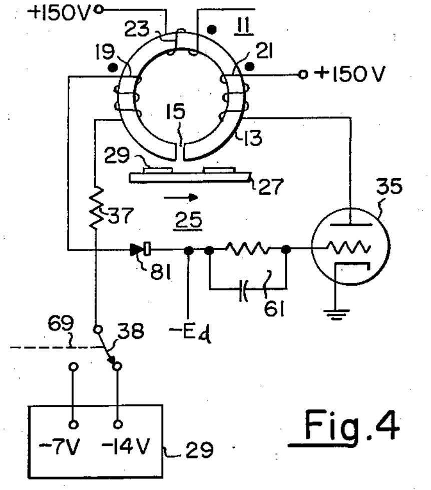
Fig. 4 is a diagram of a modification of the circuit of Fig. 1.

Fig. 4 shows a modification of the circuit of Fig. 1 in which a diode rectifier 81 is inserted in the grid circuit of triode 35. The cathode of this diode is biased from suitable source at a potential $-E_d$, below the triode cut-off potential. The effect of the biased diode, particularly as regards the input signal-noise ratio, is illustrated, graphically, in Figs. 5 and 6 each of which includes an assumed grid voltage-plate current characteristic for triode 35.

Considering, first, the operation of the circuit without diode 81, if point A represents the highest (least negative) value of grid potential which avoids oscillation of triode 35 and if $E_0$ is the value of steady grid bias which must be provided to prevent a noise wave having a peak amplitude of S from reaching the potential of point A, then the absolute value of $E_0$ must be the sum of the absolute value of S and of the potential at point A. To provide a margin of safety, in practice some larger value must be chosen because of the very gradual rate of change of the tube characteristic in the cut-off region and the variability of the cut-off point.

Figure 6:
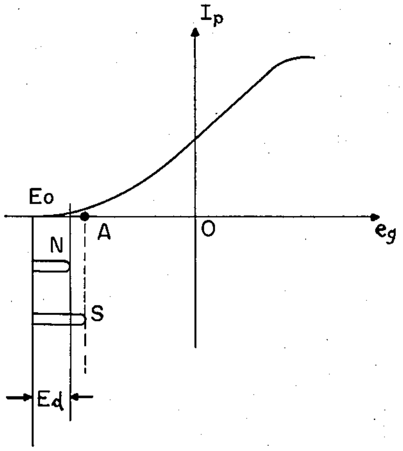

Now considering the operation of the circuit including diode rectifier 81 (Fig. 4), it is not necessary to give $E_0$ as large an absolute value because, instead of a region of uncertainty, the cathode bias of the rectifier $-E_d$ provides a clearly defined barrier which a noise peak must overcome before it is effective to trigger the oscillator circuit. With a higher (less negative) steady grid bias for triode 35, smaller operating signals can be employed. The described condition is illustrated in Fig. 6.

Figure 9:
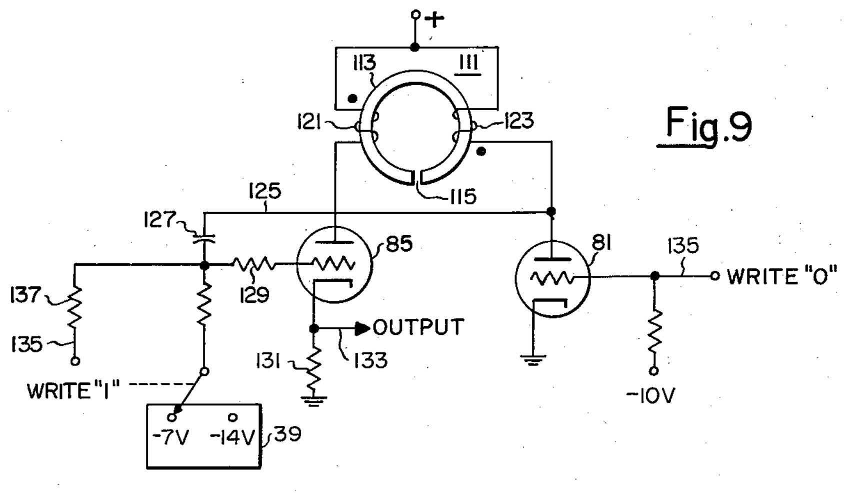
Fig. 9 is a circuit diagram of another modification of the invention.

A further modification of the circuit of the invention is shown in Fig. 9. Here instead of employing the same amplifier tube to write both "zeros" or "ones" (as triode 41 of Fig. 1), one tube, triode 81, normally biased beyond cut-off, is used to write zeros, only, while the blocking oscillator tube, triode 85, corresponding to triode 35, is employed as an amplifier to write "ones." As seen in Fig. 9, read-write head 111 comprising core 113 having gap 115 therein is provided with two windings, 121 and 123, respectively, the former connected in the plate circuit of triode 85 and the latter in the plate circuit of "write zero" triode 81, with the winding directions as indicated. According to this arrangement the M.M.F. developed in one coil is in one direction, to write "ones," while that developed in the other coil is in the opposite direction, to write "zeros." A connection is made by way of lead 125, condenser 127, and resistor 129, from the plate end of winding 123 to the grid of triode 85, to form an oscillatory circuit, as in the case of the circuits of Figs. 1 and 4. In reading, the output from triode 85 is taken in cathode followed manner across resistor 131 and appears on lead 133.

An output from normally cut off triode 85 operating as an amplifier may be obtained in two ways, (*a*) by applying a positive-going pulse of suitable amplitude to the grid by way of lead 135 and resistor 137 as illustrated in Fig. 9 or (*b*) by applying a negative-going pulse across cathode resistor 131. The first method, only, is further considered herein.

Figure 10:
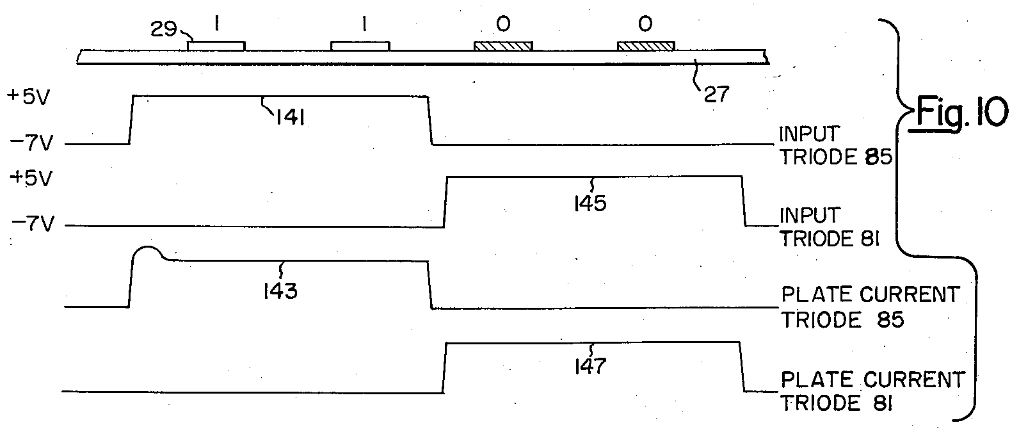
Figs. 10 and 11 are diagrams relating to the operation of the circuit of Fig. 9.
Figure 11:
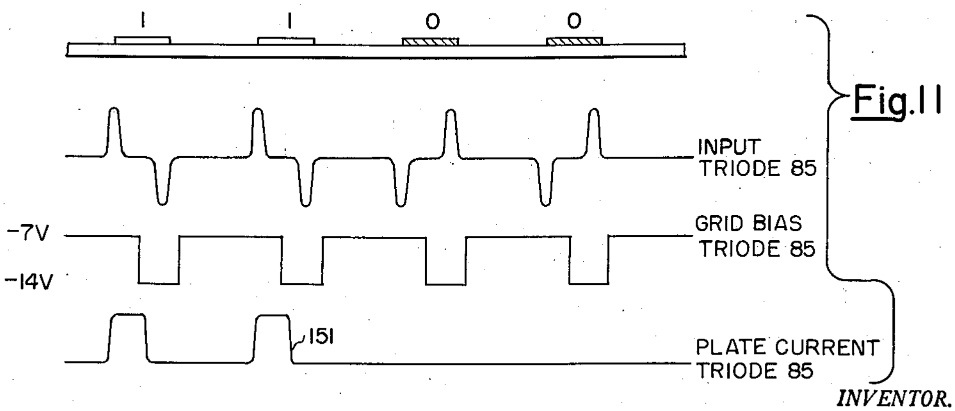

The operation of the circuit of Fig. 9 in writing and reading data is illustrated by the diagrams of Figs. 10 and 11, respectively. In both figures, as in Figs. 2 and 3, the upper line shows a sequence of discrete magnetic storage elements 29 on disc 27, for reference purposes. In Fig. 10 the second line shows a positive-going pulse 141 as an example of a pulse applied to the grid of triode 85 by way of lead 135 to write "ones." The leading edge of pulse 141 produces an incipient oscillation of triode 85 shown at the start of corresponding plate current pulse 143 on line three of the figure. After this transient, which is not significant in the present method of operation, the tube acts simply as an amplifier for the remainder of the duration of pulse 141 and supplies current to winding 121 to write "ones" on the two illustrated elements 29.

In writing "zeros," normally cut off triode 81 functions as an amplifier. An input pulse 145 for this purpose is shown on line two of Fig. 10 and the corresponding plate current pulse 147 supplied to winding 123 is shown on the bottom line, the resulting M.M.F. of coil 123 being in the reverse direction to that produced in coil 121 in writing "ones." The transition between the writing of "ones" and "zeros" occurs when no element 29 is in writing position relative to gap 115 so that there is no effect on such an element as a result of the voltage changes then occurring.

In Fig. 11 which illustrates the reading process when using the circuit of Fig. 9, the waveform of voltage generated in winding 123 as a result of the passage of magnetized elements 29 past gap 115 is shown on line two, this voltage being applied as an input to triode 85 by way of condenser 127 and resistor 129. The grid bias alternates in value as shown on line three for purposes described in connection with Fig. 3. At the leading edge of an element 29 magnetized to represent a "one" the combined bias and signal voltages trigger the oscillator, as previously described. By selection of the values of condenser 127 and resistor 129 the duration of the "one" pulses 151 of plate current, shown on the bottom line of Fig. 11 may be varied as in the case of the circuits of Figs. 1 and 4. In Fig. 11 these plate current pulses, from which the output pulses on lead 133 are derived, are illustrated, by way of example, as being of shorter duration than the time taken by an element 29 to pass gap 115.

It will be noted in comparing the operation of the circuits of Fig. 1 and Fig. 9 during the writing a "one" that while the former circuit in order to magnetize an element 29 across its entire width requires that the blocking oscillator output pulse have a corresponding duration, calling for a relatively long time constant, with the latter circuit which operates as an amplifier in writing a "one" the time constant of the oscillator circuit, used only in the reading process, can be made relatively short, thereby improving the pulse resolution.

The embodiments of the invention disclosed herein are by way of illustration and not of limitation. The limits of the invention are defined in the appended claims. In the claims, the word "directly" in such phrases as "coupled directly to" or "for applying directly to" means "without further amplification."

What is claimed is:

1. In a magnetic record system, in combination; a record surface having discrete sharply-defined areas of magnetizable material separated from each other by areas of non-magnetizable material; a read-write transducer apparatus for writing information signals on and for non-destructive reading of information signals from said magnetizable areas, the information being denoted by the polarity of the signal; and means for effecting transverse movement of said record surface relative to said transducer apparatus, said transducer apparatus comprising: a single core of magnetic material having a gap therein adjacent said record surface; a first winding on said core for producing therein read voltages of one polarity or the other in response to changes in flux in said core produced by the relative movement of recorded magnetic signals past said gap, the polarity of said read voltage being dependent upon the polarity of the recorded signal; an amplifier device having a gain control electrode and an output circuit; means for normally biasing said amplifier device beyond cutoff; means for coupling said first winding directly to said gain control electrode of said amplifier device for applying thereto, in response to a recorded signal of one polarity, a voltage of a polarity and magnitude to override said bias, thereby to trigger said amplifier device into conduction, the voltage applied in response to a recorded signal of other polarity tending to maintain said amplifier device in non-conduction; a second winding on said core; means for connecting said second winding in series in said output circuit of said amplifier device in a regenerative sense with respect to said first winding for inducing, in response to the flow of amplifier current therethrough, a voltage in said first winding of a polarity to maintain the conduction of said amplifier device for a period substantially longer than the duration of the voltage originally induced in said first winding solely by said recorded signal, for changing the flux in the vicinity of said gap to rewrite on said magnetizable surface a signal representing the same information read therefrom which triggered said amplifier device into conduction; and impedance means in the output circuit of said amplifier device for deriving a read output signal.

2. Apparatus as claimed in claim 1 characterized in that said record surface is a disc and in that said discrete sharply-defined magnetizable areas are in the form or radially extending spokes.

3. Apparatus according to claim 1 for performing said writing operation comprising a second amplifier device, a third winding wound on said core and connected in the output circuit of said second amplifier device, said second amplifier device being adapted to be triggered into conduction to cause current flow through said third winding, the conduction of said amplifier device in cooperation with said first and second windings resulting in a flux in said gap interlacing the respective record surface in proximity thereto to produce a write information signal having a magnetic flux density ($B_1$) in one direction, and the conduction of said second amplifier device in cooperation with said third winding resulting in a flux in said gap interlacing the respective record surface in proximity thereto to produce a write information signal having a magnetic flux density ($B_2$) in the opposite direction.

4. In a magnetic record system, in combination; a record surface having discrete sharply defined areas of magnetizable material separated from each other by areas of non-magnetizable material; a read-write transducer apparatus for writing information signals on and for non-destructive reading of information signals from said magnetizable areas, the information being denoted by the polarity of the recorded signal; and means for effecting transverse movement of said record surface relative to said transducer apparatus, said transducer apparatus comprising: a single core of magnetic material having a gap therein closely adjacent said record surface; a first winding on said core for producing therein read voltages of one polarity or the other in response to changes in flux in said core produced by the relative movement of recorded magnetic signals past said gap, the polarity of said read voltage being dependent upon the polarity of the recorded signal; a blocking oscillator comprising an amplifier device having an input circuit which includes said first winding connected directly through non-gain means to an input electrode of said device and an output circuit which includes a second winding on said core regeneratively coupled to said first winding; means for biasing said amplifier device normally into non-conduction, the arrangement being such that in response to the voltage induced in said first winding by the leading edge of a sharply-defined magnetized area of one polarity the bias on said amplifier device is overriden and said device is triggered into conduction; and means included in the output circuit of said blocking oscillator for deriving output signals indicative of the recorded information, the current through said amplifier device output circuit also being effective to exert on said core a magnetizing force of a magnitude and polarity to magnetize said record surface with a signal representing the same information read therefrom which triggered said amplifier device into conduction.

References Cited in the file of this patent

UNITED STATES PATENTS

| | | |
|---|---|---|
| 2,590,091 | Devol | Mar. 25, 1952 |
| 2,692,379 | Toth | Oct. 19, 1954 |
| 2,698,875 | Greenwood | Jan. 4, 1955 |
| 2,700,155 | Clayden | Jan. 18, 1955 |